(12) United States Patent
Liang et al.

(10) Patent No.: US 9,170,728 B2
(45) Date of Patent: Oct. 27, 2015

(54) ELECTRONIC DEVICE AND PAGE ZOOMING METHOD THEREOF

(71) Applicants:HONG FU JIN PRECISION INDUSTRY (ShenZhen) CO., LTD., Shenzhen (CN); HON HAI PRECISION INDUSTRY CO., LTD., New Taipei (TW)

(72) Inventors: Hai-Sen Liang, Shenzhen (CN); Chih-San Chiang, New Taipei (TW); Te-Jia Liu, Shenzhen (CN); Hua-Dong Cheng, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 279 days.

(21) Appl. No.: 13/864,256

(22) Filed: Apr. 17, 2013

(65) Prior Publication Data

US 2014/0143717 A1    May 22, 2014

(30) Foreign Application Priority Data

Nov. 20, 2012    (CN) .......................... 2012 1 0471159

(51) Int. Cl.
*G06F 3/048* (2013.01)
*G06F 3/0488* (2013.01)

(52) U.S. Cl.
CPC .... *G06F 3/0488* (2013.01); *G06F 2203/04806* (2013.01); *G06F 2203/04808* (2013.01)

(58) Field of Classification Search
CPC ..................................................... G06F 3/0488
USPC ......................................................... 715/800
See application file for complete search history.

(56) References Cited

U.S. PATENT DOCUMENTS

| | | | |
|---|---|---|---|
| 8,416,217 B1* | 4/2013 | Eriksson et al. | 345/175 |
| 2009/0300554 A1* | 12/2009 | Kallinen | 715/863 |
| 2010/0293500 A1* | 11/2010 | Cragun et al. | 715/784 |
| 2011/0265021 A1* | 10/2011 | Chien et al. | 715/769 |
| 2011/0298724 A1* | 12/2011 | Ameling et al. | 345/173 |
| 2013/0021381 A1* | 1/2013 | Zhang et al. | 345/661 |

* cited by examiner

*Primary Examiner* — Matthew Ell
(74) *Attorney, Agent, or Firm* — Novak Druce Connolly Bove + Quigg LLP

(57) ABSTRACT

A page zooming method for an electronic device includes the following steps. Displaying a page on the touch screen. Generating operation signals in response to a touch operation applied on the displayed page. Determining the touch operation as a page zoom gesture if one or more points on the displayed page is touched. Determining a quantity of the touched points of the touch operation, and determining the page zoom gesture is a zoom in gesture or a zoom out gesture and a zoom ratio according to the determined quantity of the touched points. Creating a zoomed page according to the displayed page, the determined zoom ratio and the determined type of the page zoom gesture. Displaying the zoomed page on the touch screen. An electronic device using the page zooming method is also provided.

4 Claims, 2 Drawing Sheets

ELECTRONIC DEVICE AND PAGE ZOOMING METHOD THEREOF

BACKGROUND

1. Technical Field

The present disclosure relates to electronic devices and page zooming methods thereof, and particularly to, an electronic device having a touch screen and a page zooming method for the electronic device.

2. Description of Related Art

Electronic devices with touch screens, e.g., mobile phones, digital photo frames, electronic readers (e-reader), are capable of zooming the page displayed on the touch screen by manipulating the touch screen. For example, to zoom out the displayed page, the user uses two fingers sliding towards each other, and to zoom in the displayed page, the user uses two fingers sliding away from each other. However, both two fingers slide when applying the zooming method, which cannot satisfy various demands of different users.

Therefore, what is needed is an electronic device and a page zooming method thereof to alleviate the limitations described above.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding sections throughout the several views.

DETAILED DESCRIPTION

Figure 1:
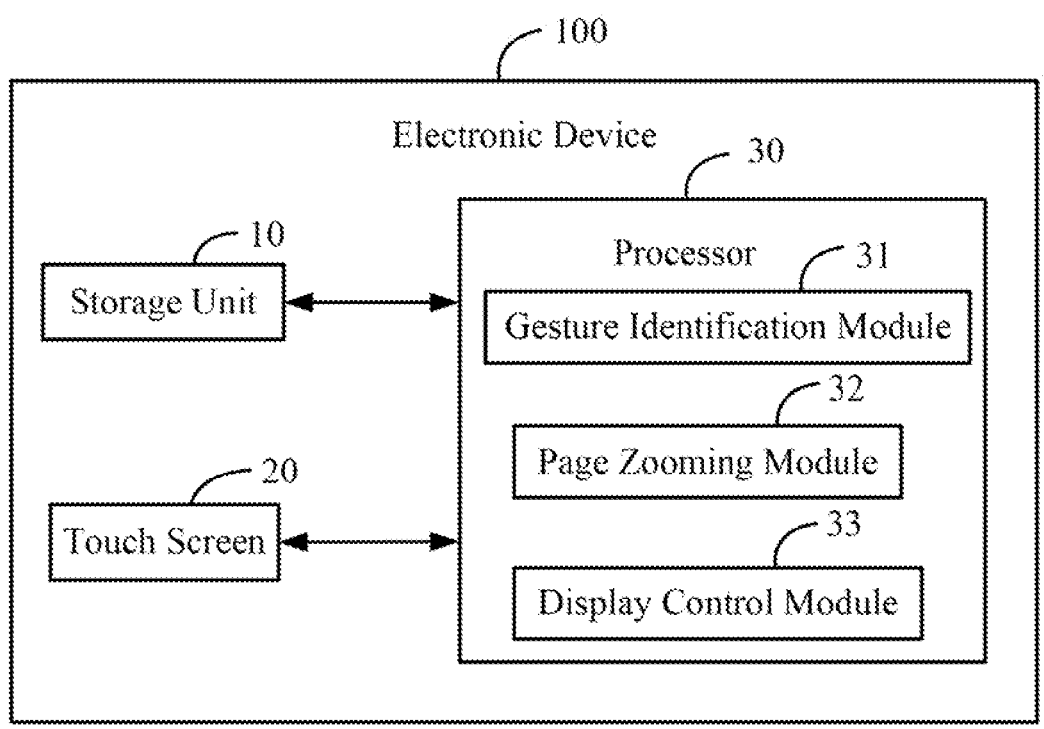
FIG. 1 is a block diagram of an electronic device in accordance with an exemplary embodiment.

FIG. 1 is an exemplary embodiment of a disclosure of an electronic device 100. The electronic device 100 can conveniently zoom a displayed page in or out in response to a touch operation. The electronic device 100 is a mobile terminal with a touch screen, such as a mobile phone. In alternative embodiments, the electronic device 100 can be other electronic devices with touch screens, such as an electronic reader, a tablet, a digital phone frame, a tablet or the like.

The electronic device 100 includes a storage unit 10, a touch screen 20, and a processor 30. The storage unit 10 stores a plurality of electronic files. The electronic file includes pictures, and/or photos, for example. The touch screen 20 is configured for generating operation signals in response to a touch operation. For example, the user can operate the touch screen to open an electronic file, flip pages, zoom a displayed page in or out, select a page, or drag a page for example.

The processor 30 includes a gesture identification module 31, a page zooming module 32, and a display control module 33.

In the embodiment, when a particular function of the electronic device 100 is activated, the touch screen 20 displays a default icon interface or a page of an electronic file selected by a user. The displayed page includes an image such as a picture, for example. In an alternative embodiment, the displayed page can also include characters and/or figures, for example. The user can zoom the displayed page in or out by applying a zoom gesture on the displayed page.

The gesture identification module 31 is configured for identifying the touch operation according to the operation signals generated by the touch screen 20 in response to a touch operation. The gesture identification module 31 is also configured for determining whether the identified touch operation is a page zoom gesture, and determining the type of the page zoom gesture if the identified touch operation is a page zoom gesture. The gesture identification module 31 also transmits the identified and determined results to the page zooming module 32.

In this embodiment, if the gesture identification module 31 identifies one or more points on the displayed page is touched, the gesture identification module 31 determines the identified touch operation is a page zoom gesture. The gesture identification module 31 continues to determine the quantity of the touched points of the touch operation applied on the displayed page, and determines the type of the page zoom gesture and a zoom ratio according to the determined quantity of the touched points. The type of the page zoom gesture is selected from the group consisting of the zoom in gesture and the zoom out gesture. The zoom ratio is proportional to the determined quantity of the touched points.

In an embodiment, when the gesture identification module 31 determines that the quantity of the touched points of the touch operation applied on the displayed page is less than a predetermined value, the gesture identification module 31 determines the touch operation is a zoom out gesture. When the gesture identification module 31 determines that the quantity of the touched points of the touch operation applied on the displayed page is more than or equal to the predetermined value, the gesture identification module 31 determines the touch operation is a zoom in gesture. The zoom ratio is proportional to the determined quantity of the touched points.

For example, presuming the predetermined value is two, if the user touches the displayed page with one finger, the gesture identification module 31 determines that the quantity of the touched points is one, and is less than the predetermined value. The gesture identification module 31 determines the type of the touch operation is a zoom out gesture and the zoom ratio is 50%. That is, the displayed page is determined to be zoomed out to the half size of its original size. If the user touches the displayed page with more than one finger at a time, the gesture identification module 31 determines that the quantity of the touched points is equal or more than the predetermined value. The gesture identification module 31 determines the type of the touch operation is a zoom in gesture and the zoom ratio is equal to the quantity of the touched points multiplied by 100%. If the user uses two fingers to touch the displayed page, then the determined quantity of the touched points is two, the gesture identification module 31 determines the zoom ratio is 200%, that is, the displayed page is to be enlarged to the double size of its original size. If the user uses three fingers to touch the displayed page, the quantity of the touched points is three, the gesture identification module 31 determines the zoom ratio is 300%, that is, the displayed page is to be enlarged to three times of its original size.

It is to be understood, the proportional relationship between the zoom ratio and the quantity of the touched points can be varied according to need.

In another embodiment, when the gesture identification module 31 determines that the quantity of the touched points of the touch operation applied on the displayed page is less than a predetermined value, the gesture identification module 31 determines the touch operation is a zoom in gesture. When the gesture identification module 31 determines that the quantity of the touched points of the touch operation applied on the displayed page is more than or equal to the predetermined value, the gesture identification module 31 determines the touch operation is a zoom out gesture. The zoom ratio is proportional to the determined quantity of the touched points.

For example, presuming the predetermined value is also two, if the user touches the displayed page with one finger, the gesture identification module 31 determines that the quantity of the touched points is one, and is less than the predetermined value. The gesture identification module 31 determines the type of the touch operation is a zoom in gesture and the zoom ratio is 200%. That is, the displayed page is determined to be enlarged to double size of its original size. If the user touches the displayed page with more than one finger at a time, the gesture identification module 31 determines that the quantity of the touched points is equal or more than the predetermined value. The gesture identification module 31 determines the type of the touch operation is a zoom out gesture and the zoom ratio is equal to the one quantity of the touched points multiplied by 100%. If the user uses two fingers to touch the displayed page, then the determined quantity of the touched points is two, the gesture identification module 31 determines the zoom ratio is 1/2×100%, that is, the displayed page is to be zoomed out to the half size of its original size. If the user uses three fingers touching the displayed page, the quantity of the touched points is three, the gesture identification module 31 determines the zoom ratio is 1/3×100%, that is, the zoom ratio is 33.3%, and the displayed page is to be zoomed out to one third size of its original size.

The page zooming module 32 is configured to create a zoomed page according to the displayed page, the determined zoom ratio and the type of the page zoom gesture. In the embodiment, if the gesture identification module 31 identifies the touch operation is a zoom in gesture, the page zooming module 32 creates a zoomed page which is zoomed in with the determined zoom ratio relative to the current page displayed on the touch screen 20. If the gesture identification module 31 identifies the touch operation is a zoom out gesture, the page zooming module 32 creates a zoomed page which is zoomed out with the determined zoom ratio relative to the current page displayed on the touch screen 20.

The display control module 33 controls to display the zoomed page created by the page zooming module 32 on the touch screen 20.

In the embodiment, once a zoom gesture is applied on the touch screen 20, the page zooming module 32 creates a zoomed page which is zoomed in/out with the predetermined zoom ratio relative to the current page displayed on the touch screen 20. The display control module 33 controls to display the zoomed page on the touch screen 20. The page zooming module 32 creates real-time zoomed page in response to the zoom gesture. In an alternative embodiment, the page zooming module 32 creates a zoomed page when the zoom gesture ends, e.g. the user may apply zoom gesture on the touch screen 20 more than once within a predetermined time period.

Figure 2:
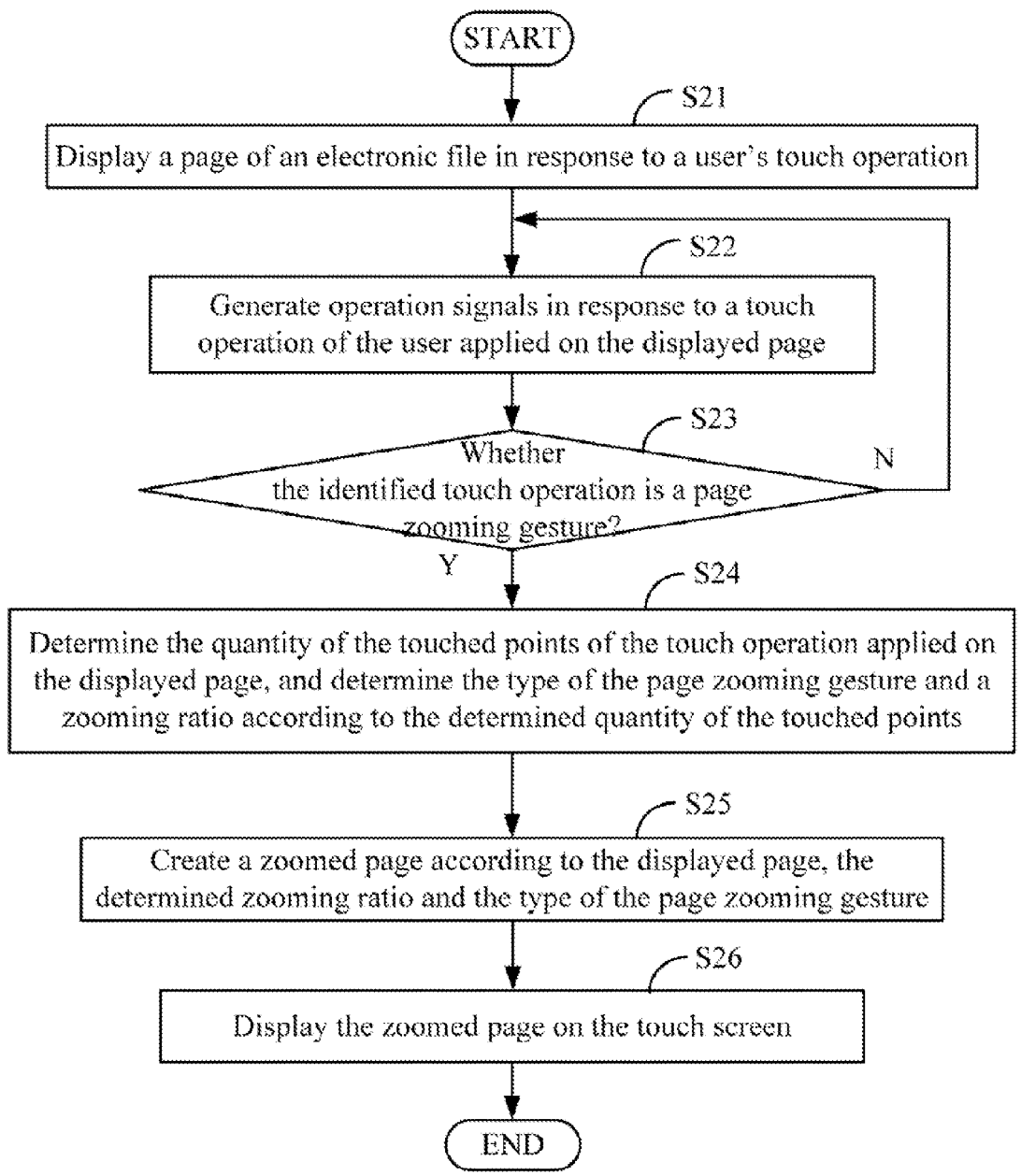
FIG. 2 is a flowchart of a page zooming method for electronic devices, such as the one of FIG. 1, in accordance with the exemplary embodiments.

FIG. 2 shows a flowchart of a page zooming method of the electronic device 100 of FIG. 1. The electronic device 100 includes a touch screen. The touch screen is configured for generating operation signals in response to touch operations. The method includes the following steps, each of which is related to the various components contained in the electronic device 100.

In step S21, the touch screen 20 displays a page of an electronic file in response to a touch operation.

In step S22, the touch screen 20 generates operation signals in response to a touch operation applied on the displayed page.

In step S23, the gesture identification module 31 identifies the touch operation according to the operation signals generated by the touch screen 20, and determines whether the identified touch operation is a page zoom gesture. If yes, the process goes to step S24, otherwise, the process goes back to step S22. In this embodiment, if the gesture identification module 31 identifies one or more points on the displayed page is touched, the gesture identification module 31 determines the identified touch operation is a page zoom gesture.

In step S24, the gesture identification module 31 determines the quantity of the touched points of the touch operation applied on the displayed page, and determines the type of the page zoom gesture and a zoom ratio according to the determined quantity of the touched points. The type of the page zoom gesture is selected from the group consisting of a zoom in gesture and a zoom out gesture. The gesture identification module 31 also transmits the determined results to the page zooming module 32.

In step S25, the page zooming module 32 creates a zoomed page according to the displayed page, the determined zoom ratio and the type of the page zoom gesture. In the embodiment, if the gesture identification module 31 identifies the touch operation is a zoom in gesture, the page zooming module 32 creates a zoomed page which is zoomed in with the determined zoom ratio relative to the current page displayed on the touch screen 20. If the gesture identification module 31 identifies the touch operation is a zoom out gesture, the page zooming module 32 creates a zoomed page which is zoomed out with the determined zoom ratio relative to the current page displayed on the touch screen 20.

In step S26, the display control module 33 is controlled to display the zoomed page created by the page zooming module 32 on the touch screen 20.

With such a configuration, when a user wants to zoom in or zoom out the page displayed on the touch screen 20, the user can use one or more fingers to touch the displayed page, then, the displayed page is zoomed in or zoomed out accordingly and the zoomed page is displayed on the touch screen 20. The user can conveniently and dynamically control zoom in or zoom out of the page displayed on the touch screen 20 and the zoom ratio (the size of the zoomed page) by using different quantities of fingers to touch on the page displayed on the touch screen 20.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A page zooming method for an electronic device having a touch screen, the method comprising:
    displaying a page on the touch screen;
    generating operation signals in response to a touch operation applied on the displayed page;
    determining the touch operation as a page zoom gesture if one or more points on the displayed page is touched;
    determining a quantity of the touched points of the touch operation, and determining whether the determined quantity of the touched points of the touch operation is less than a predetermined value;
    if the determined quantity of the touched points of the touch operation is less than a predetermined value, determining a type of the page zoom gesture is the zoom out gesture, and determining a zoom ratio is 50%;
    if the determined quantity of the touched points of the touch operation is more than or equal to the predetermined value, determining the type of the page zoom gesture is the zoom in gesture, and determining the zoom ratio is equal to the quantity of the touched points multiplied by 100%;

creating a zoomed page according to the displayed page, the determined zoom ratio and the determined type of the page zoom gesture; and displaying the zoomed page on the touch screen.

2. The method as described in claim 1, wherein the determined zoom ratio is proportional to the determined quantity of the touched points.

3. An electronic device, comprising:

a touch screen to generate operation signals in response to a user's touch operation; and a processor and a plurality of modules to be executed by the processor, the modules comprising:

a gesture identification module to determine the touch operation as a page zoom gesture if one or more points on a page displayed on the touch screen is touched, determine a quantity of the touched points of the touch operation, and determine whether the determined quantity of the touched points of the touch operation is less than a predetermined value; wherein if the determined quantity of the touched points of the touch operation is less than a predetermined value, the gesture identification module determines a type of the page zoom gesture is the zoom out gesture, and determines a zoom ratio is 50%; if the determined quantity of the touched points of the touch operation is more than or equal to the predetermined value, the gesture identification module determines the type of the page zoom gesture is the zoom in gesture, and determines the zoom ratio is equal to the quantity of the touched points multiplied by 100%;

a page zooming module to create a zoomed page according to the displayed page, the determined zoom ratio and the determined type of the page zoom gesture; and a display control module to display the page and the zoomed page on the touch screen.

4. The electronic device as described in claim 3, wherein the determined zoom ratio is proportional to the determined quantity of the touched points.

\* \* \* \* \*